US005455997A

United States Patent [19]

Nasiell

[11] Patent Number: 5,455,997

[45] Date of Patent: Oct. 10, 1995

[54] THREADING INITIATION METHOD

[76] Inventor: Gustav Nasiell, 746 Q Avenida Majorca, Laguna Hills, Calif. 92653

[21] Appl. No.: 71,662

[22] Filed: Jun. 2, 1993

Related U.S. Application Data

[63] Continuation-in-part of Ser. No. 25,328, Feb. 19, 1993, abandoned.

[30] Foreign Application Priority Data

Aug. 31, 1992 [SE] Sweden .................................. 9202499

[51] Int. Cl.[6] ............................ B23P 11/00; B25B 23/16; B25G 1/02

[52] U.S. Cl. ........................... 29/456; 29/888.011; 81/64; 81/177.6

[58] Field of Search .................................... 29/456, 525.1, 29/888.011; 81/53.11, 53.12, 64, 90.1, 90.3, 177.6; 294/19.1, 19.2

[56] References Cited

U.S. PATENT DOCUMENTS

| | | | |
|---|---|---|---|
| 508,314 | 11/1893 | Hill | 279/43.2 X |
| 900,766 | 10/1908 | Nagel . | |
| 1,056,084 | 3/1913 | Bates | 81/53.12 |
| 2,704,005 | 3/1955 | Clayson | 81/177.6 |
| 2,766,060 | 10/1956 | Fuller | 81/53.12 X |
| 3,585,885 | 6/1971 | Carr | 81/177.6 X |
| 3,837,244 | 9/1974 | Schera | 81/64 |
| 4,483,562 | 11/1984 | Schoolman | 81/177.6 X |
| 4,730,960 | 3/1988 | Lewis et al. | 81/177.6 X |
| 4,876,929 | 10/1989 | Kozak | 81/177.6 X |
| 4,967,612 | 11/1990 | Sparling | 81/64 |
| 5,074,173 | 12/1991 | Cearly | 81/177.6 |

FOREIGN PATENT DOCUMENTS

| | | |
|---|---|---|
| 2563101 | 1/1978 | U.S.S.R. . |
| 8724898 | 10/1987 | United Kingdom . |

*Primary Examiner*—Tom Hughes
*Attorney, Agent, or Firm*—Connors & Associates; John J. Connors

[57] ABSTRACT

Disclosed is a tool 20 for grasping a nut 9 and initiating the threading of the nut to a the difficult-to-access threaded counterpart element 28 which is in a difficult-to-access location. The tool 20 includes a socket body 1 having expandable jaws 5 that have spring action. The jaws 5 terminate in an open mouth **5*a* having a configuration corresponding to the configuration of the nut 9. The nut 9 is manually inserted into the open mouth 5*a* with the nut disposed in an orientation that enables it to be positioned in the difficult-to-access socket 28. The socket body is connected to a flexible arm 11 having a passageway 33 extending though it which houses a flexible shaft 34. This shaft 34 is connected to the socket body 1, so that rotation of the shaft rotates the socket body. The arm 11 includes a series of interconnected links 11*a* which may be turn and twisted relative to each other to configure the arm 11 to reach the difficult-to-access socket 28. The jaws 5 grasp the nut 9**, releasably holding the nut until the it is manually screwed to the difficult-to-access threaded counterpart element.

10 Claims, 8 Drawing Sheets

FIG. 10
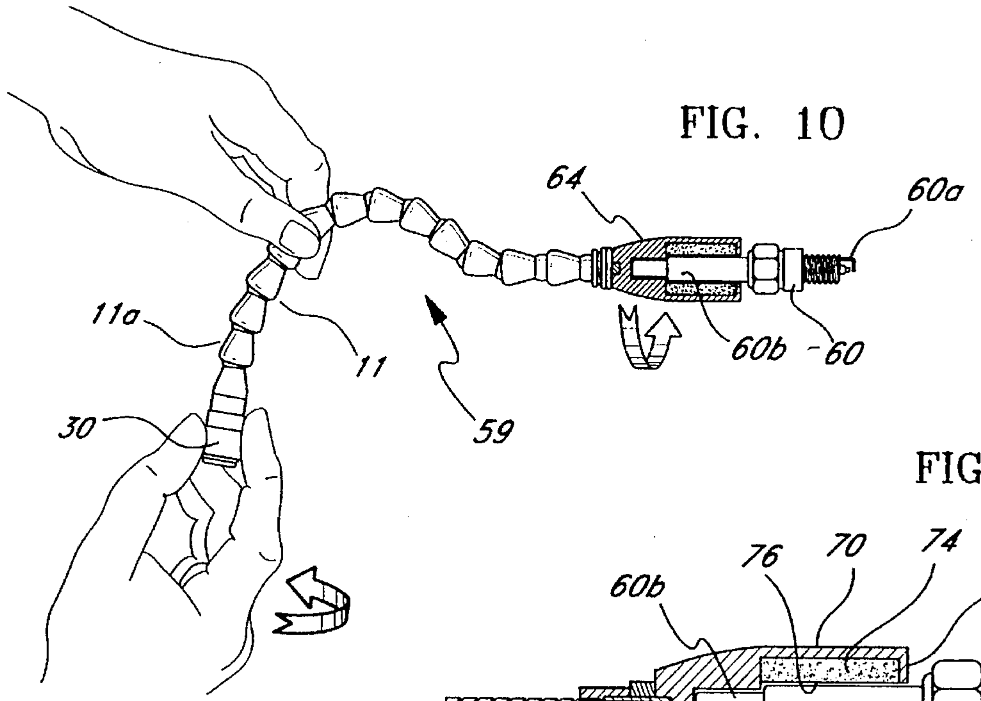
FIG. 12
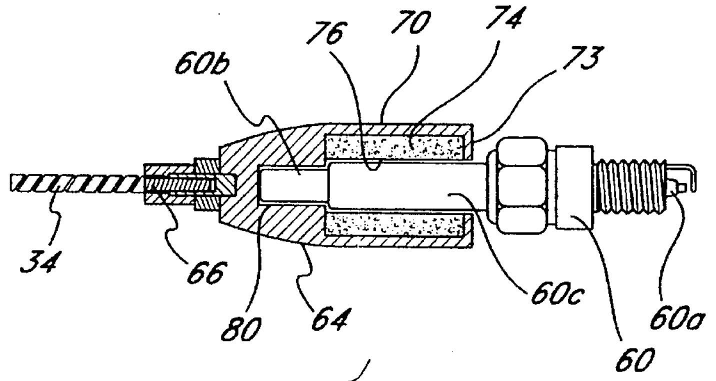
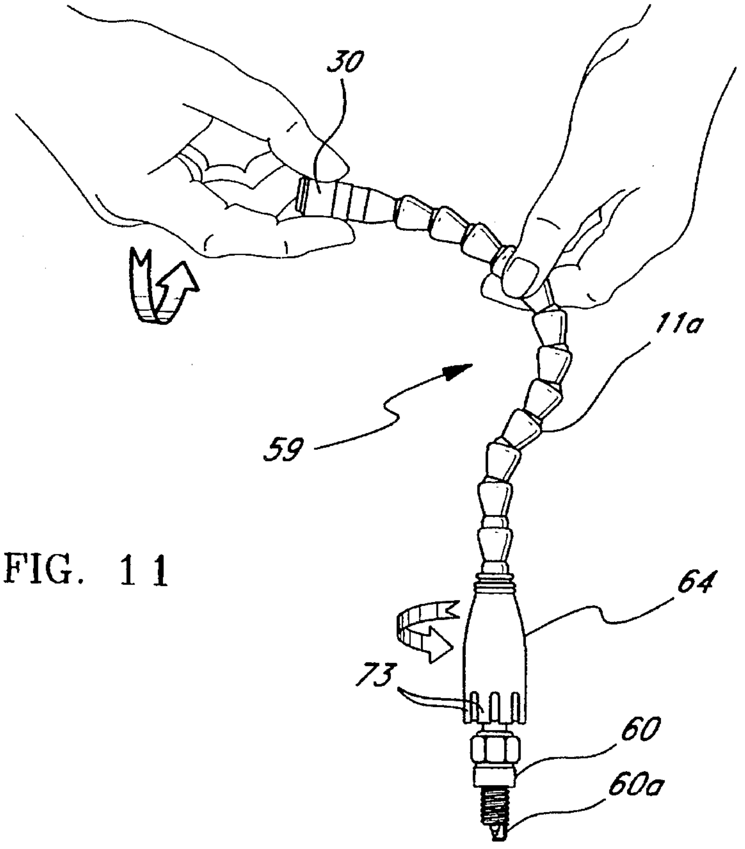
FIG. 11

THREADING INITIATION METHOD

RELATED PATENT APPLICATION

This patent application is a continuation-in-part of U.S. patent application Serial No. 08/025,328, filed Feb. 19, 1993 and now abandoned, and entitled Threading Initiation Tool & Method. This related patent application is incorporated herein and made a part of this patent application.

BACKGROUND OF THE INVENTION

1. Field of the Invention

This invention relates to a tool and method for initiating the threading of a nut, screw, or similar fastener to a threaded counterpart element which is in a difficult-to-access location. As used herein "threaded counterpart element" is any mating, threaded counterpart element to the fastener, for example, a cavity having its wall threaded, a nut, a treaded post, rod, bolt, or screw, or equivalent connecting device. One embodiment of this invention is particularly adapted for use in screwing spark plugs into an engine, and another embodiment is particularly adapted for use in screwing thin nuts of different sizes to a threaded post or the like.

2. Background Discussion

There are many situations, particular in auto repair and maintenance, where a threaded counterpart element is located in a very difficult-to-access location, including locations which are accessible by hand but the surrounding structure is very hot like an idling engine. In order to insert a screw, nut, or similar fastener to the threaded counterpart element, a special tool is required, which typically is magnetized. Thus, the head of the screw or nut is attracted to and held to an end of the tool by magnetic forces. Sometimes, grease, which serves as an adhesive, is applied to the end of a screw driver, socket, or other tool, and the fastener, for example, a screw or nut, is pressed against the grease laden tip, bonding it to the tool. These approaches do not provide an adequate solution to the problems associated with difficult-to-access threaded counterpart elements, primarily because they are only applicable to a very limited number of situations. There many locations of the threaded counterpart element which can only be accessed by an elongated, flexible arm that is bent into a shape that reaches the difficult-to-access element at the correct angle and rotate the fastener while maintaining the angular relationship between the fastener and the threaded counterpart element. If this cannot be accomplished, adjacent mechanical structures must be disassembled, which is very time consuming and expensive.

SUMMARY OF THE INVENTION

It is the objective of this invention to provide a tool and method for initiating the threading of a fastener to a threaded counterpart element which is in a difficult-to-access location.

The tool and method of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its advantages, which include low cost construction, simplicity and ease of use, and access to threaded counterpart element locations which would otherwise require disassembly of adjacent mechanical structures.

The first feature of the tool is a grasping member having an open mouth into which a portion of the fastener is manually inserted. The grasping member may have several different structures. The fastener is disposed in the grasping member in an orientation that enables the fastener to be positioned at the difficult-to-access threaded counterpart element. The grasping member releasably holds the fastener until the fastener is manually screwed into the threaded counterpart element.

The second feature is that a flexible arm is attached to the grasping member which includes means which enable the grasping member while holding the fastener to be rotated. The grasping member typically includes a first coupling member. The a r m may be fixed to the grasping member or it may be removably attached to the grasping member. The flexible arm has a free distal end and a proximal end having a second coupling member adapted to engage the first coupling member. The arm has an elongated passageway extending between the proximal end and the distal end. There is a flexible shaft extending along the passageway having one end connected to the second coupling in the arm and another end which is remote and accessible to enable the shaft to be manually rotated, thereby rotating the socket body and the fastener held by the socket body.

The third feature is that the arm may comprise a plurality of individual, hallow links, connected end to end and movable relative to each other, to enable the arm to be manually twisted into numerous different shapes. The links are press fitted together into an elongated, hallow structure providing the passageway, with friction tending to maintain the links in position. This elongated structure is manually twisted into the desired shape to access the threaded counterpart element. Once formed into the desired shape, the links, because of the friction fit, resist relative movement and tend to remain in the desired position. The arm is manually twistable into a configuration that enables the socket body with the fastener held in the jaw elements and attached to the proximal end of the arm to be moved into a position adjacent the difficult-to-access threaded counterpart element. Thus, the fastener may be screwed into the difficult-to-access threaded counterpart element.

In one embodiment of this invention the grasping member is a socket body having expandable jaw elements forming the open mouth into which the head of the fastener is manually inserted. Thus, the socket body serves as a gripper to hold the fastener. The socket body may have several different configurations such as, for example, rectangular, cylindrical, or square. It may be made of spring steel, but preferably is made of a polymeric material such as nylon shaped into a substantially cylindrical wall having a plurality of spaced apart slits therein to provide wall segments between the slits forming the jaw elements. The polymeric material is sufficiently rigid and flexible so that the jaw elements have spring action. The first coupling member is seated in the socket body remote from the open mouth. This first coupling member may simply be an opening into which the end of a rotatable shaft is inserted.

In another embodiment of this invention is particularly suited for use with spark plugs. As is well known, the spark plug has a spark emitting end and a connector end. In this case, the head of a fastener and fastener are components of the spark plug. Typically, the fastener and its head are adjacent the spark emitting end of the spark plug. In this embodiment of the invention, a resilient plug member is removably disposed in the socket body. This plug member has a central, open ended cavity into which the spark plug is inserted. The plug member holds the spark plug firmly in place, so that the spark plug does not rotate relative to the socket body. The socket body has a connector end remote from the open mouth. The plug member is seated in the socket body with a receptacle member therein adjacent the connector end of the socket body and internal to the open mouth. The connector end of the spark plugs is inserted manually into the receptacle upon pushing the spark plug into the socket body.

In still another embodiment of this invention the grasping member has a pair of jaw elements where one is a stationary jaw element and the other is a flexible jaw element. Preferably, the jaw elements are about equal to the thickness of a conventional hex nut.

The fourth feature is that the ends of the jaw elements terminate in a configuration corresponding to the configuration of the fastener. This enables the fastener to be manually inserted into the open mouth, with the fastener disposed in an orientation that enables the fastener to be positioned in the difficult-to-access threaded counterpart element. The jaw elements grasp the fastener and releasably hold the fastener until it is screwed into the difficult-to-access threaded counterpart element.

The fifth feature is one or more elastic O-ring around the socket body movable between a first position remote from the open mouth to second position at the open mouth to constrict the open mouth to enable smaller fasteners to be held securely.

The sixth feature is that the flexible shaft has a handle member attached to an end of the shaft. The handle includes a cavity with an internal wall. The end of the shaft is received within the cavity and a plug is force fitted into the cavity to wedge said end of the shaft between the wall and the plug holding the shaft fixedly in position.

This invention also includes a method for grasping a portion of a fastener and initiating the connection of the fastener and a threaded counterpart element which is in a difficult-to-access location. This method comprises (a) providing a grasping member which is adapted to grasp the fastener and releasably hold the fastener until the fastener is manually attached to the threaded counterpart element, (b) manually inserting the fastener into the grasping member grasp the fastener in an orientation that enables the fastener to be positioned at the difficult-to-access threaded counterpart element, (c) providing an arm which is manually twistable into a configuration that enables the grasping member with the fastener held thereby to be moved into a position adjacent the difficult-to-access threaded counterpart element, so that the fastener may be attached to said difficult-to-access threaded counterpart element, said arm having an elongated passageway extending between a proximal end and a distal end, and having a flexible shaft extending along the passageway and having one end coupled to the grasping member and another end which is remote and accessible to enable the shaft to be manually rotated, thereby rotating the grasping member and the fastener held thereby, (d) moving said arm with the fastener being held by the grasping member into proximity with the difficult-to-access threaded counterpart element and engaging said fastener and said threaded counterpart element, and (e) rotating said shaft, so that said fastener and said threaded counterpart element are connected by threading together.

BRIEF DESCRIPTION OF THE DRAWING

The preferred embodiment of this invention, illustrating all its features, will now be discussed in detail. This embodiment depicts the novel and non-obvious tool and method of this invention shown in the accompanying drawing, which is for illustrative purposes only. This drawing includes the following figures (FIGS.), with like numerals indicating like parts:

FIG. 10 is a perspective view illustrating the use of a fourth embodiment of this invention especially designed to hold a spark plug.

FIG. 11 is a perspective view similar to that shown illustrating that the tool may be inverted and retain its grip on the spark plug.

FIG. 12 is a cross sectional view of the socket member of the tool illustrated in FIG. 10 with a spark plug inserted into the socket member.

FIG. 22 is a cross sectional view similar to that of FIG. 19 showing the socket member holding a 7/16 inch diameter hex nut.

DESCRIPTION OF THE PREFERRED EMBODIMENTS

First Embodiment

Figure 4:
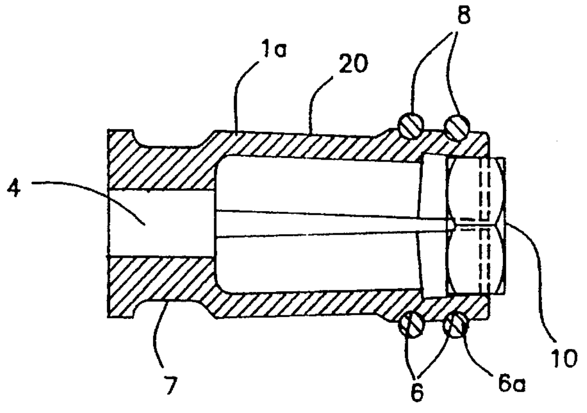
FIG. 4 is a cross-sectional view similar to FIG. 2, showing the socket body holding a nut of smaller diameter than that shown in FIG. 3.
Figure 3:
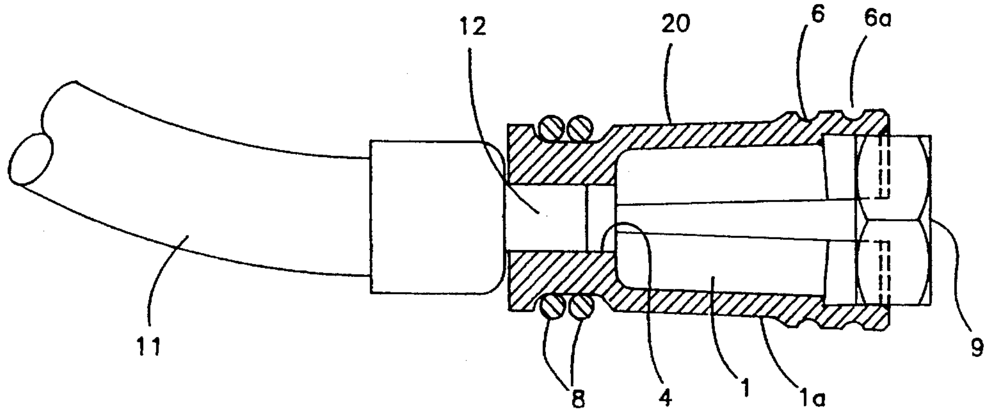
FIG. 3 is a cross-sectional view similar to FIG. 2, showing the socket body of the tool connected to an arm, with the socket body grasping an enlarged nut.
Figure 1:
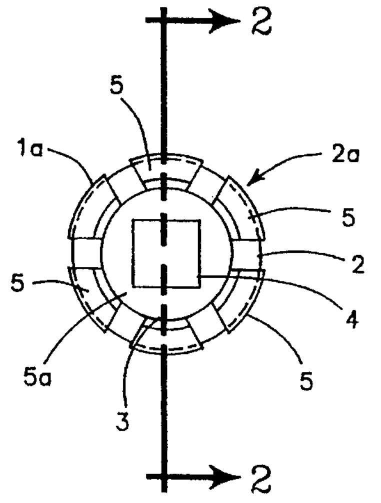
FIG. 1 is an end-view taken along line 1—1 of FIG. 2, looking into the mouth of the tool of this invention.
Figure 2:
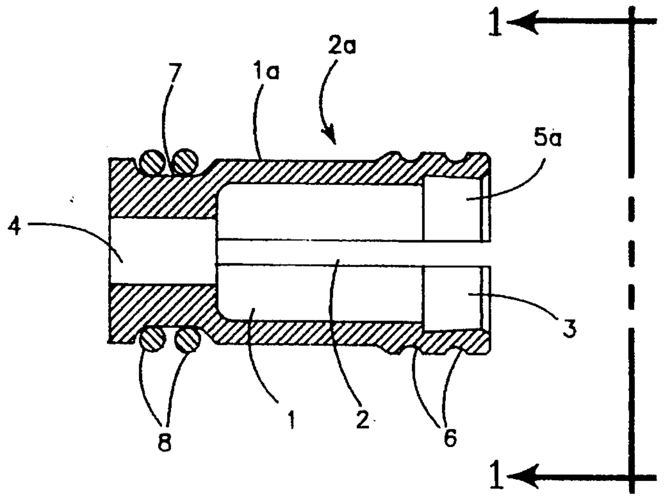
FIG. 2 is a cross-sectional view taken along line 2—2 of FIG. 1.

As best shown in FIGS. 1 and 2, the first embodiment of this invention, the tool 20, includes a socket body 1, preferably made of a rigid yet flexible polymeric material such as polypropylene. The socket body 1 has a substantially cylindrical wall 1*a*, having elongated slits 2 therein to form between the slits 2 wall segments which serve as flexible jaws 5. The jaws 5 are configured at one end in an open mouth 5*a* having, for example, a hexagonal configuration corresponding to the shape of the nuts 9 and 10 to be grasped in the open mouth, as depicted in FIGS. 3 and 4. There is a generally square opening 4 at the remote end, which is adapted to receive a coupling 12 (FIG. 3) at the end of a flexible arm 11. This coupling 12 has a generally square cross-section and is adapted to fit into the square opening 4 in the socket body 1.

Figure 5:
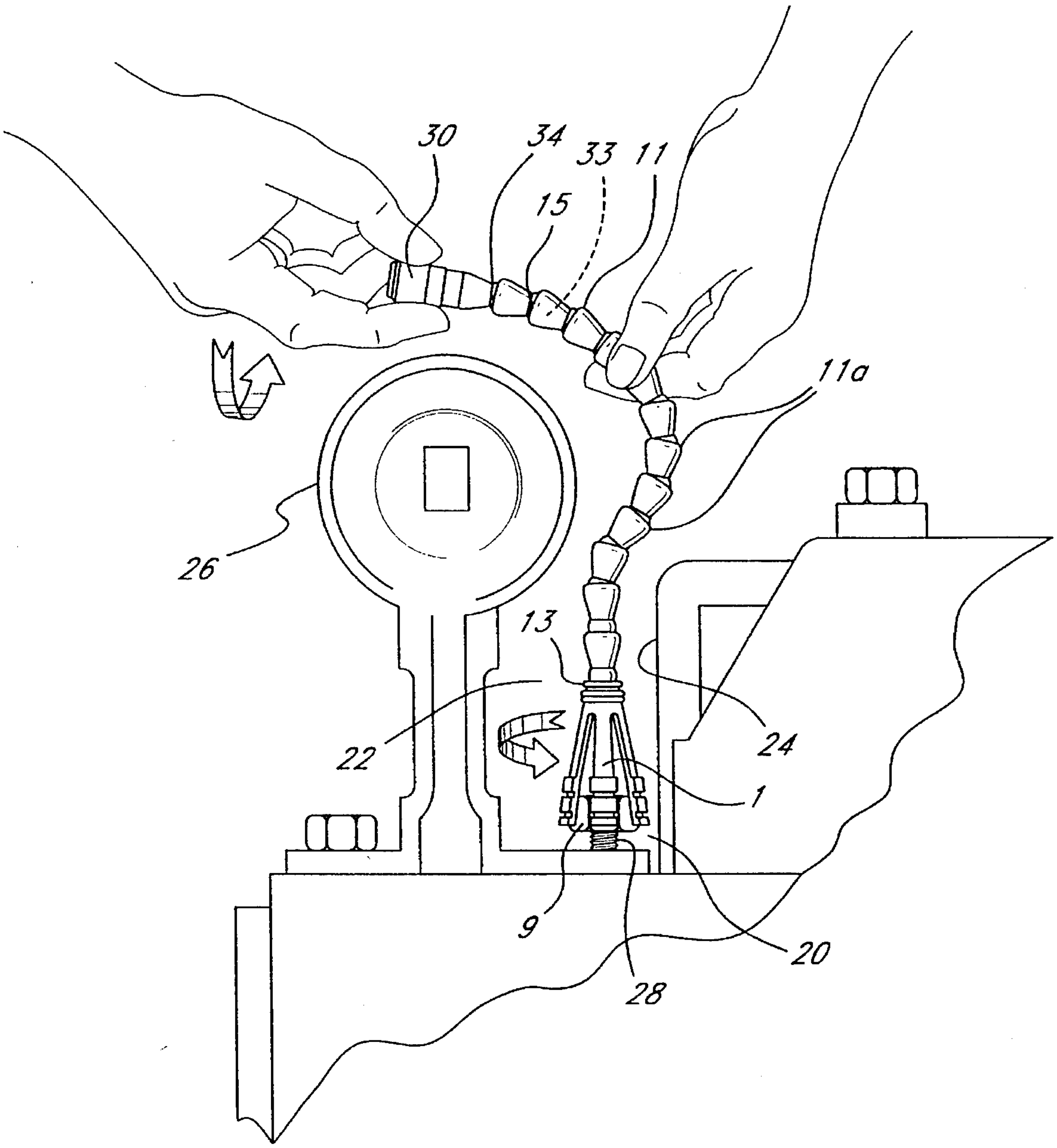
FIG. 5 is a side-elevational view showing a second embodiment of the tool used to thread a nut into a difficult access threaded counterpart element.

As shown in FIGS. 3, the jaws 5 hold the nut 9 firmly, but releasably, in the mouth 5*a*, enabling the arm 11 to be inserted into, for example as shown in FIG. 5, the space 22 between a wall 24 and a mechanical structure 26, so that the nut 9 may be moved adjacent the threaded counterpart element 28. Engagement between the nut 9 and the threaded counterpart element 28 is achieved by rotating the socket body 1.

Second Embodiment

In accordance with the second embodiment of this invention as depicted in FIG. 5, the arm 11 may be a series of links 11*a* connected end-to-end so that they can be twisted and configured so that the arm may be moved into the space 22. The links 11a fit tightly together, with friction tending to maintain the relative positions of the links once they have been twisted into the desired configuration. There is an elongated passageway 33 shown in dotted lines which extends between the proximal end 13 of the arm 11 and the distal end 15 of the arm. A flexible shaft 34 extends inside and along the length of the passageway 33. The coupling 12 (FIG. 3) is connected to one end of the shaft 34 and a knob 30 is connected to the other end of the shaft 34.

Figure 24:
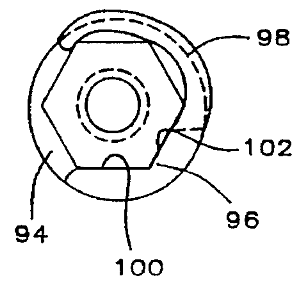
FIG. 24 is a cross-sectional view taken along line 24—24 of FIG. 23.
Figure 25:
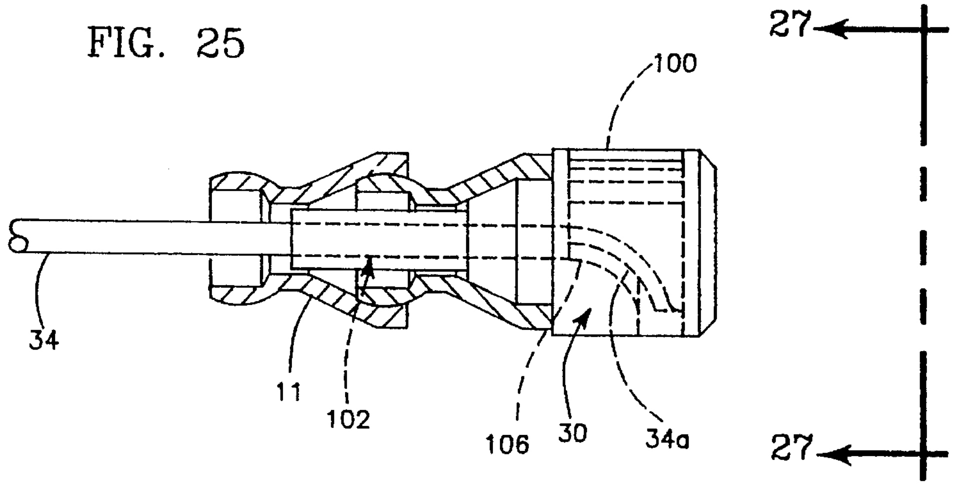
FIG. 25 is a partial cross-sectional view of the handle attachment for the flexible shaft.
Figure 27:
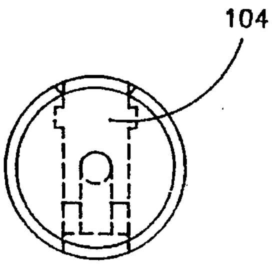
FIG. 27 is a cross-sectional view taken along line 27—27 of FIG. 25.
Figure 26:
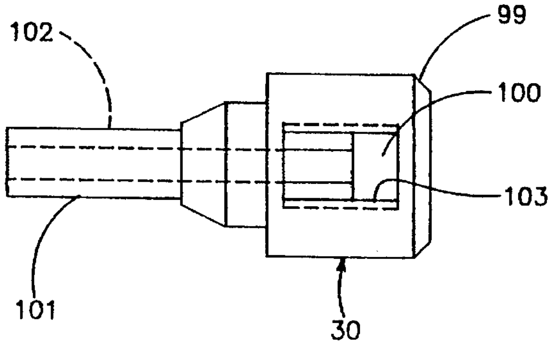
FIG. 26 is a top plan view of the handle attachment for the flexible shaft.
Figure 28:
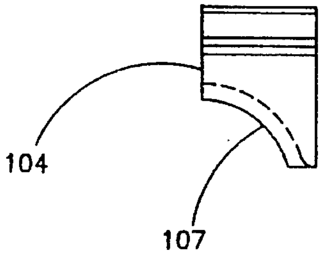
FIG. 28 is side elevational view of the plug used in the handle attachment.

In FIG. 24 the details of the construction of the links 11*a* and the manner in which they are connected is illustrated. Each link 11*a* is essentially identical to every other link, and comprises a hallow body 11*b* having a an enlarged circular open forward end 11*c* having a internal, segmented, spherical wall 11*d* and a reduced diameter, open rear end 11*e* having an external, segmented spherical wall 11*f*. The rear end 11*e* is force fitted into the open forward end 11*c* of an adjacent link 11*a*. This construction enables one individual link to be moved relative to an adjacent link to twist the flexible arm 11 into essentially any desired shape. A suitable flexible arm sold under the trademark LOC-LINE by Lockwood Products, Inc. of Lake Oswego, Oreg.

To use the tool 20, a nut, for example the nut 9, is inserted into the mouth 5*a* as shown in FIG. 3, causing the jaws 5 to flex outwardly, and the coupling 12 is inserted into the square opening 4 in the socket body 1. As shown in FIG. 5, the arm 11 is moved into the space 22, bringing the tool 20 with the nut 9 into an engaging relationship with the threaded counterpart element 28. The user rotates the knob 30, rotating the shaft 34 to screw the nut 9 onto the threaded counterpart element 28. When the nut 9 has been secured to the threaded counterpart element 28, the socket body 1 is simply manually pulled away from the nut which is now secured to the threaded counterpart element.

In accordance with an important feature of this invention, the jaws 5 may be manually moved inward to grasp a nut which has a diameter less than the diameter of the open mouth 5*a*. Specifically, at the remote end of the socket body 1 is an annular, circumferential groove 7 (FIG. 4) having a wide recess section, and at the opposite end are a pair of adjacent annular grooves 6 and 6*a*, which are not as shallow as the recess section of groove 7. The groove 7 holds a pair of elastic O-rings 8 which may be manually slipped over the exterior of the wall la of the socket body 1, and moved, respectively, into the grooves 6 and 6*a* as depicted in FIG. 4. This forces the jaws 5 together, constricting the diameter of the mouth 5*a* to enable the tool 20 to grasp firmly, but releasably, the nut 10, which is smaller in diameter than the nut 9.

Third Embodiment

Figure 6A:
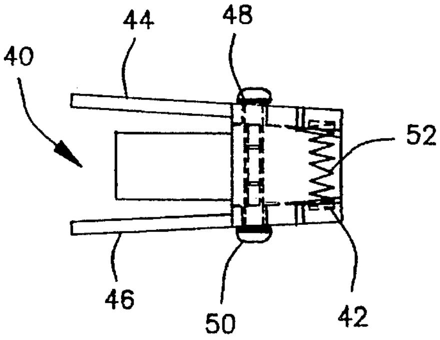
FIG. 6A is a side view of a third embodiment of this invention in an open position ready to grasp a nut as depicted in FIG. 7.
Figure 9:
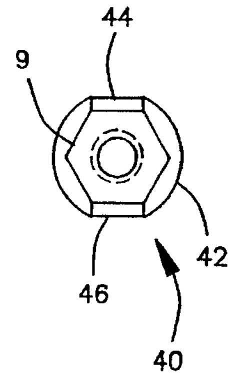
FIG. 9 is an end-elevation view taken along line 9—9 of FIG. 7.
Figure 7:
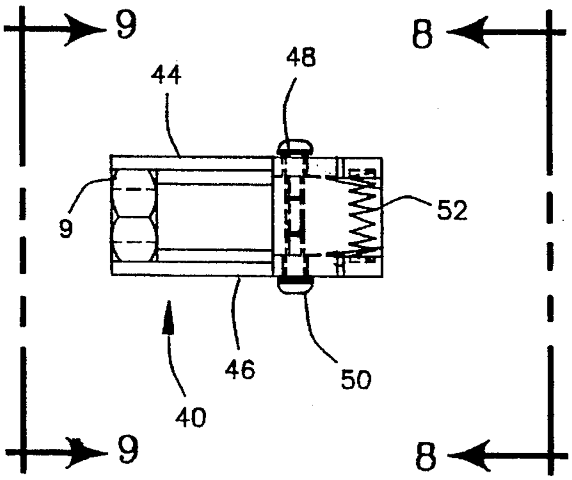
FIG. 7 is side view similar to FIG. 6, showing the tool grasping a nut.
Figure 8:
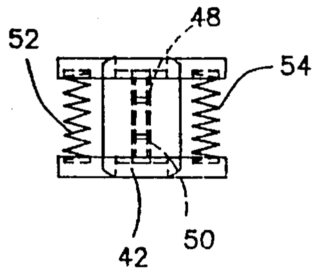
FIG. 8 is an end-elevational view taken along line 8—8 of FIG. 7.
Figure 6B:
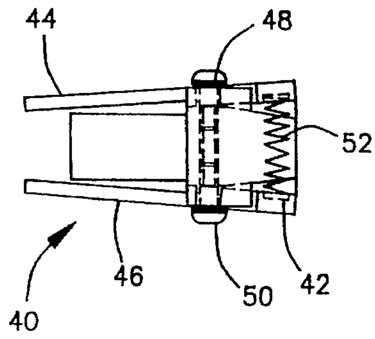
FIG. 6B is a side view similar to that of FIG. 6A in an closed position.
Figure 13:
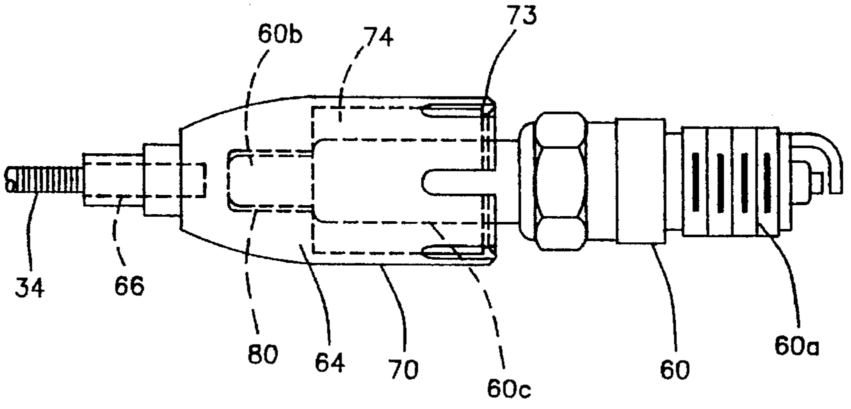
FIG. 13 is a side elevational view of the socket member of the tool illustrated in FIG. 10 with a spark plug inserted into the socket member.
Figure 14:
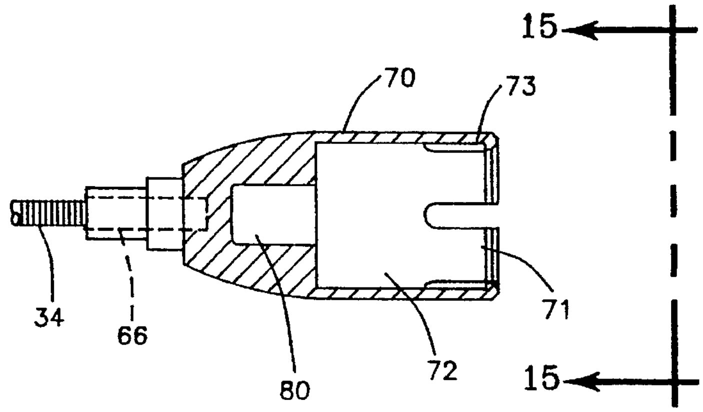
FIG. 14 is a cross sectional view of the socket member of the tool illustrated in FIG. 10 without a spark plug inserted into the socket member and a gripper plug removed from the cavity within the socket member.
Figure 15:
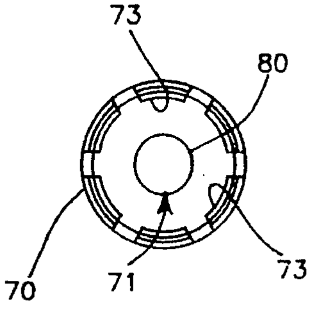
FIG. 15 is a cross-sectional view taken along line 15—15 of FIG. 14.
Figure 16:
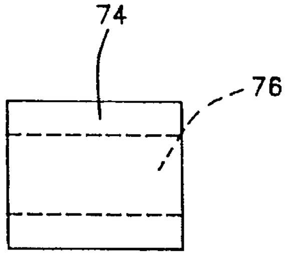
FIG. 16 is a side elevational view taken of the gripper plug used with the tool shown in FIGS. 10 through 15.

As depicted in FIGS. 6 through 9, the third embodiment of this invention, the tool 40, includes a socket body 42 having two opposed wall members 44 and 46 that are hinged at pivot pins 48 and 50, respectively, to the upper section of the socket body. There are a pair of springs 52 and 54 on opposite sides of the upper section which normally push outward so that the free ends of the walls are close to one another as shown in FIG. 8. By manually grasping the upper ends of these wall members 44 and 46, and pressing inward, the spring force is overcome to cause the wall members to pivot, with their lower ends moving away from each other as shown in FIG. 6. The nut 9 may be inserted between the lower ends of the wall members 44 and 46 and the grasp released, so that the nut is held firmly, but releasably, between the wall members as shown in FIG. 7. With the nut 9 held in the socket body 42, the socket body is connected to an arm 11 as discussed above so that the socket body may be rotated along with the nut and attached to a difficult-to-access threaded counterpart element 28.

Fourth Embodiment

Figure 17:
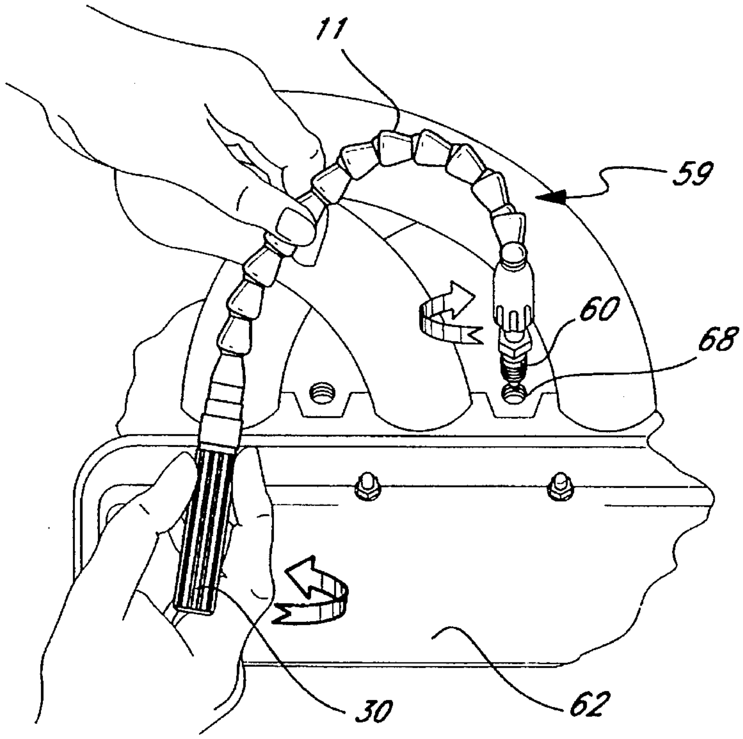
FIG. 17 is perspective view showing one way of how the tool shown in FIG. 10 is used to initiate threading a spark plug held by the tool into a threaded cavity in an automotive engine.
Figure 18:
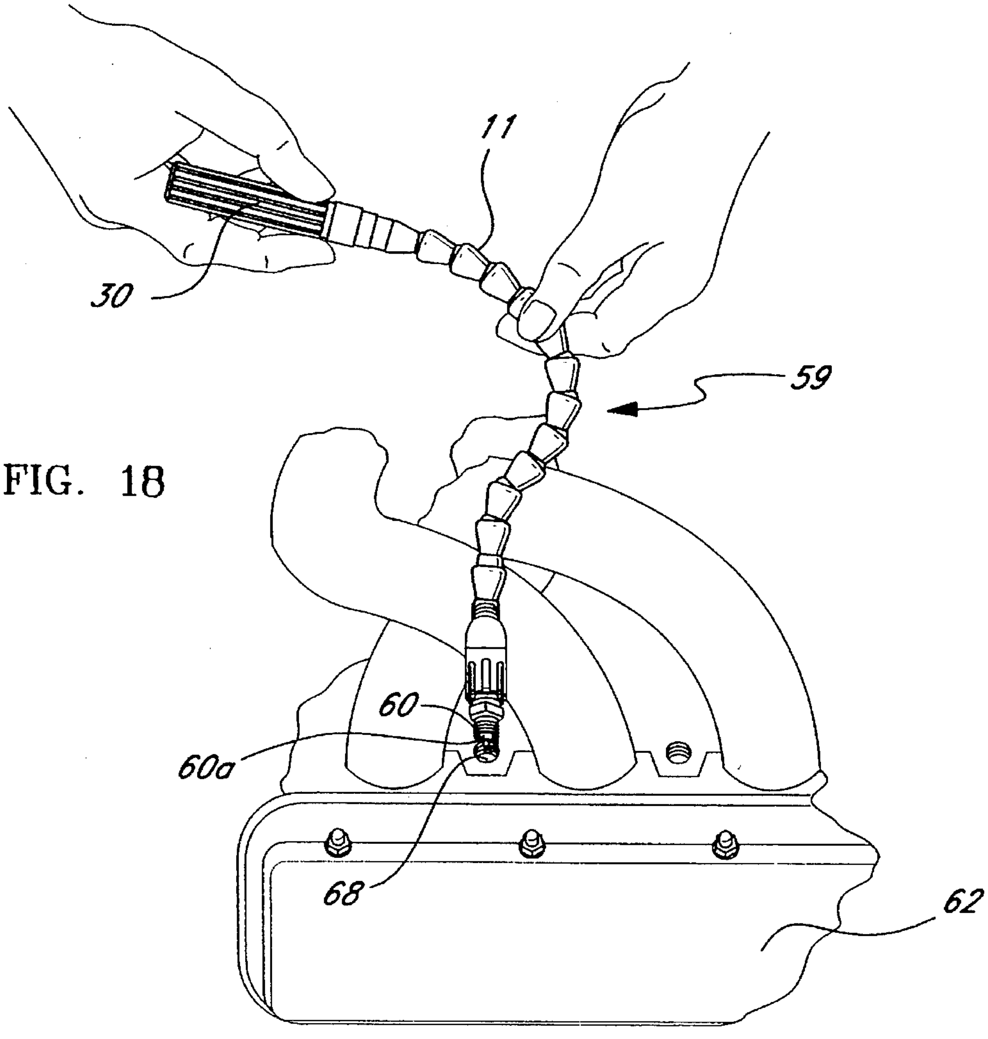
FIG. 18 is perspective view showing another way of how the tool shown in FIG. 10 is used to initiate threading a spark plug held by the tool into a threaded cavity in an automotive engine.
Figure 19:
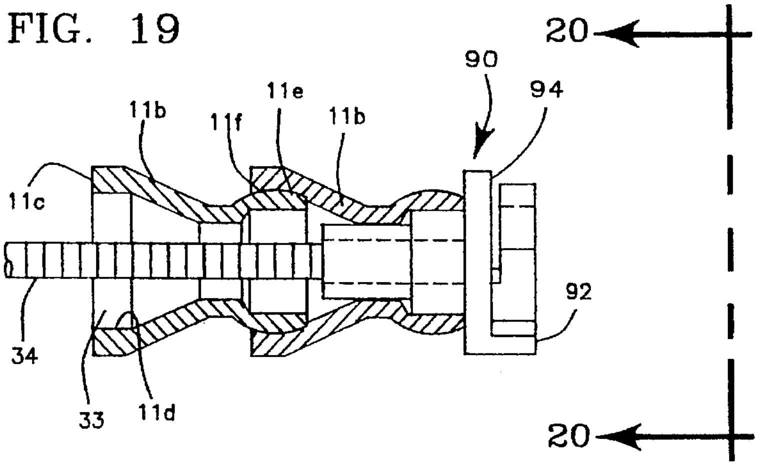
FIG. 19 is a cross sectional view of the fifth embodiment of the tool of this invention using a socket member especially adapted for use with hex nuts.
Figure 20:
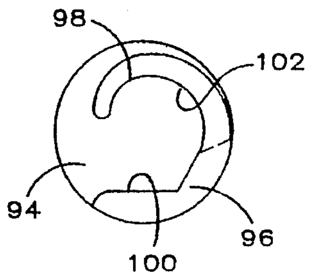
FIG. 20 is a cross-sectional view taken along line 20—20 of FIG. 19.
Figure 21:
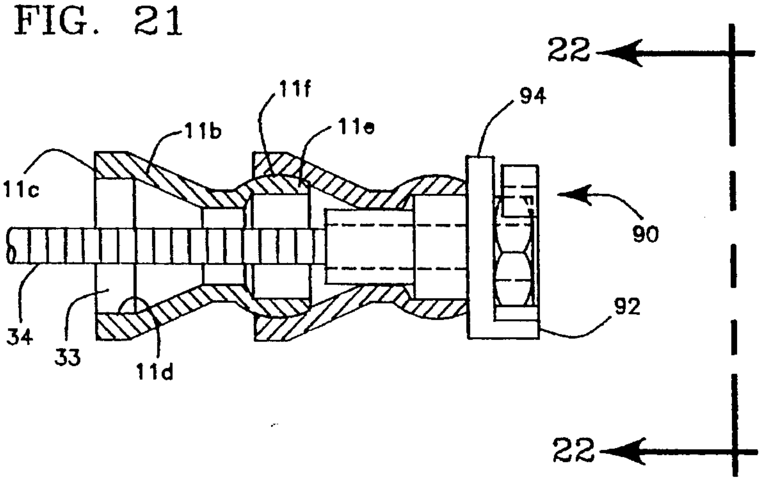
FIG. 21 is a cross sectional view similar to that of FIG. 19 showing the socket member holding a ⅜ inch diameter hex nut.

As depicted in FIGS. 10 through 18, the fourth embodiment of this invention, the tool 59, is particularly adapted to be used to initiate connection of a spark plug 60 to an engine 62 (FIGS. 17 and 18). As is typical, the spark plug 60 has a spark emitting end 60*a* and a connector end 60*b*. In this embodiment, the socket member 64 is especially designed to releasably hold the spark plug 60. A flexible arm 11 has its shaft 34 connected by a coupling 66 that enables the socket member 64 to be positioned adjacent a difficult-to-access counterpart connecting element, such as a socket 68 in the engine 62 which receives the spark plug. The spark plug 60 is gripped firmly, yet once the threading of the spark plug to the threaded cavity 68 has been accomplished, pulling the tool 59 away from the engine results in the release of the spark plug 60 from the grasp of the socket member 64.

As depicted in FIGS. 12 through 16, the socket member 64 includes a cylindrical-like body 70 having at its forward end an open mouth 71 into which the connector end 60*b* of the spark plug 60 is inserted. There is an internal cavity 72 (FIGS. 14 and 15) within the cylindrical-like body 70 in which is seated a foam rubber or plastic hallow cylindrical gripper plug 74. This gripper plug 74 fits snug within the cavity 72, and preferably is bonded to the inside wall of the cavity 72 with an adhesive. There are fingers 73 at the mouth 71 of the cavity 72 which assist in holding the gripper plug 74 in place and aid in grasping the spark plug 60. An elongated, cylindrical hole 76 receives the connector end 60*b* of the spark plug 60 which passes through this hole when the spark plug is inserted into the socket member 64. An intermediate section 60*c* of the spark plug 60 forces the hole 76 to expand when the spark plug 60 is inserted, with the gripper plug 74 grasping this intermediate section 60*c*, holding the spark plug 60 firmly, but releasably. When worn out, the gripper plug 74 may be easily removed and replaced. At the back of the cavity 72 remote from the open mouth 71, is a receptacle 80 at the rear end of the socket body 64 internal to the open mouth. The connector end 60*b* of the spark plug 60 is push into the receptacle 80 when the spark plug is inserted into the socket member 64.

Fifth Embodiment

As illustrated in FIGS. 19 through 24, the fifth embodiment of this invention, tool 90, employs a unique socket member 92 which is especially designed to grasp different sized, nuts or heads of bolts, such as ⅜ or 7/16 diameter hex nuts or bolts.

Figure 22:
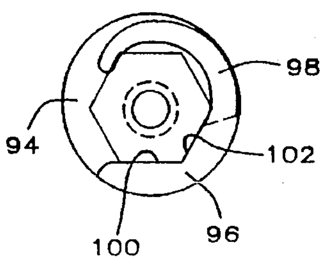
FIG. 22 is a cross-sectional view taken along line 22—22 of FIG. 21.
Figure 23:
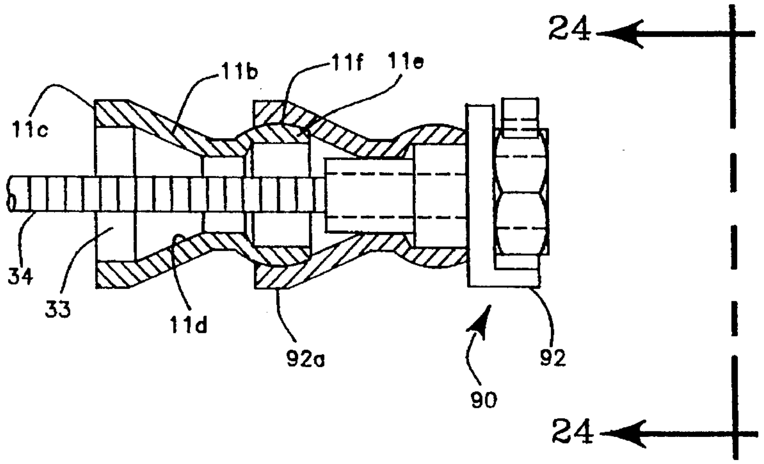

The socket member 92 comprises a substantially flat surfaced base 94 to which is attached a pair of jaw elements 96 and 98. The one jaw element 96 is fixed rigidly to the base 94 and is stationary or immovable. The other jaw element is attached at an end to the stationary jaw element 96, but is flexible and acts like an index finger to expand or contract depending on the size of the nut placed between the jaw elements 96 and 98. The jaw element 98 has two, flat adjacent surfaces 100 and 102 disposed at an angular relationship corresponding to the angular relationship of the gripping surfaces of the nut to be grasped. As a nut is forced between the jaw elements 96 and 98, the gripping surfaces of the nut engage the flat surfaces 100 and 102 and the jaw element 98 flexes to open the socket member. In FIG. 22, the socket member 92 is illustrated holding an ⅜ inch diameter hex nut, and in FIG. 24, the socket member 92 is illustrated holding an 7/16 inch diameter hex nut.

Sixth Embodiment

In accordance with an important feature of this invention, the handle or knob 30 is attached fixedly to the shaft 34 in an efficient, time saving and cost effective manner. As shown in FIGS. 25 through 28, the knob 30 has a head member 99 with an outward, elongated shaft retainer 101 with an elongated channel 102 that allows the end 34*a* of the shaft 34 to extend into a cavity 100 in the head member 99. A plug 104 is force fitted into the cavity 100, passing though an open mouth 103 of the cavity 100. The plug 104 engages the end 34*a* of the shaft 34, bending this end towards an internal, arcuate wall 106 in the cavity 100. There is a complementary arcuate wall 107 in the plug 104. Thus, the end 34*a* of the shaft 34 is wedged snugly between the arcuate walls 106 and 107, so that this end 34*a* does not pull loose.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. A method for grasping a portion of a fastener and initiating the connection of the fastener and a threaded counterpart element which is in a difficult-to-access location, including (a) providing a grasping member which is adapted to grasp the fastener and releasably hold the fastener until the fastener is manually attached to the threaded counterpart element, (b) manually inserting the fastener into the grasping member to grasp the fastener in an orientation that enables the fastener to be positioned at the difficult-to-access threaded counterpart element, (c) providing the grasping member with an arm which is manually twistable into a configuration that enables the grasping member with the fastener held thereby to be moved into a position adjacent the difficult-to-access threaded counterpart element, so that the fastener may be attached to said difficult-to-access threaded counterpart element, said arm comprising a plurality of individual links connected end to end and movable relative to each other, enabling the arm to be manually twisted into numerous different shapes and, solely by friction between said links without the aid of an additional mechanical mechanism to hold the links in position, to be maintained in a selected one of said different shapes suited to access said difficult-to-access location until twisted into another shape, said connected links having an elongated passageway extending therethrough between a proximal end and a distal end of said arm, and a flexible shaft extending along the passageway and having one end coupled to the grasping member and another end which is remote and accessible to enable the shaft to be manually rotated, thereby rotating the grasping member and the fastener held thereby, (d) twisting said arm and maintaining it said selected shape, (e) after being twisted into said selected shape moving said arm with the fastener being held by the grasping member into proximity with the difficult-to-access threaded counterpart element and engaging said fastener and said threaded counterpart element, (f) rotating said shaft, so that said fastener and said threaded counterpart element are connected by threading together.

2. The method of claim 1 where the grasping member includes a socket body having expandable jaw elements forming an open mouth into which the fastener is manually inserted, said jaw elements grasping the fastener and releasably holding the fastener until said fastener is manually screwed into the counterpart element.

3. The method of claim 2 where the socket body is made of a polymeric material that is flexible so that the jaw elements have spring action.

4. The method of claim 2 where there are a plurality of slits in the socket body with segments of the socket body between the slits forming the jaw elements.

5. The method of claim 2 where there is an elastic O-ring around the socket body movable between a first position remote from the open mouth to second position at the open mouth to constrict said open mouth.

6. The method of claim 2 where the the fastener is a component of a spark plug.

7. The method of claim 6 where a resilient plug member is removably disposed in said socket body, said plug member having a central, open ended cavity into which the spark plug is inserted, said plug member holding the spark plug firmly in place, so that said spark plug does not rotate relative to the socket body.

8. The method of claim 6 where the spark plug has a spark emitting end and a connector end, and the socket body has an end remote from the open mouth, with the plug member having a receptacle adjacent the connector end of the socket body and internal to the open mouth, said connector end of the spark plug being inserted manually into the receptacle.

9. The method of claim 2 where the jaw elements include one stationary jaw element and another flexible jaw element.

10. The method of claim 1 where the flexible shaft has a handle member attached to an end of the shaft, said handle including a cavity with an internal wall, and the end of the shaft is received within the cavity and a plug is force fitted into the cavity to wedge said end of the shaft between the wall and the plug holding the shaft fixedly in position.

* * * * *

UNITED STATES PATENT AND TRADEMARK OFFICE

CERTIFICATE OF CORRECTION

PATENT NO. : 5,455,997

DATED : Oct. 10, 1995

INVENTOR(S) : Gustav Nasiell

It is certified that error appears in the above-indentified patent and that said Letters Patent is hereby corrected as shown below:

Title page, item [57], col. 2,

In the ABSTRACT: Line 2 "to a the" delete "the"; Line 10 delete "socket 28." and replace with --threaded counterpart element 28.--; Line 12 change "though" to "through"; Line 15 change "turn" to "turned"; Line 17 delete "socket 28." and replace with --threaded counterpart element 28.--; Line 18 "until the it is" delete "the"

Column 1, Line 19 change "a treaded" to "a threaded"; Line 43 add --are-- to "There--are--many"

Column 3, Line 47 add --to-- after "member" and before "grasp" "member--to--grasp"

Column 6, Line 9 change "having a an enlarged" by deleting "a"

Column 6, LIne 10 change "a internal" to "an internal"

Column 7, Line 42 change "is push into" to "is pushed into"

Column 10, Line 5 "where the the fastener" delete the second "the"

Signed and Sealed this

Ninth Day of April, 1996

Attest:

Bruce Lehman

BRUCE LEHMAN

Attesting Officer

Commissioner of Patents and Trademarks